Sept. 17, 1935.  C. C. WASHER  2,014,995

LOCK WASHER

Filed April 11, 1935

Inventor:—
Chandler C. Washer
by his Attorneys
Howson & Howson

Patented Sept. 17, 1935

2,014,995

UNITED STATES PATENT OFFICE 2,014,995

LOCK WASHER

Chandler C. Washer, Philadelphia, Pa., assignor to Philadelphia Steel & Wire Corporation, Philadelphia, Pa., a corporation of Pennsylvania Application April 11, 1935, Serial No. 15,861

2 Claims. (Cl. 151—36)

This invention relates to split type lock washers and has for an important object thereof the provision of a lock washer of this type which is free from the objectionable features of spreading and breaking quite common to the type.

Such lock washers as most commonly formed are produced by coiling a keystone-shaped wire which, in the coiling process, is transformed from keystone to rectangular form. The coils are then passed between shear jaws which sever the individual washers. The action of the shear jaws forms on the inner face of one end of the washer and the outer face of the opposite end thereof, a flattened portion and in the flattening or swedging the metal of the washer is flared to the opposite axial faces producing projecting points. These points, while not seriously objectionable in connection with washers underlying a nut applied with a hand wrench have been found highly unsatisfactory when utilized under nuts applied with high speed power wrenches. The projecting points, particularly if the nut happens to be of small external diameter, catch against the facets of the nut at the bottom thereof and cause the washer to spread and break. Furthermore, many nuts have a slightly rounded under surface and where this is the case the point of the washer tends to ride outwardly and spread the washer. Such spread and broken washers, if undetected, are dangerous; and when detected, require considerable time for replacement, particularly in a rapidly moving assembly chain.

I have discovered that by utilizing a modified keystone section, which in the coil produces a cross section rectangular but having its corners beveled so that the prongs formed by the swedging of the metal in the shears do not project above the normal surface of the axial faces of the washer or lie below such faces, the spreading can be avoided.

Referring now to the drawing, wherein for the purpose of illustration I have shown preferred embodiments of my invention and preferred modified keystone sections for producing the same:

Figure 1:
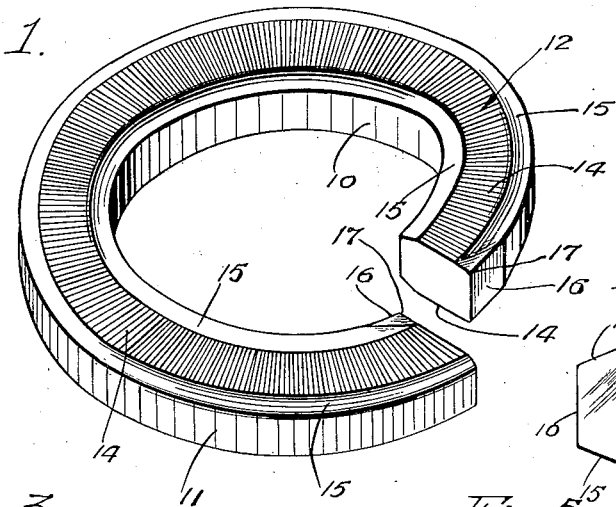
Fig. 1 is a perspective view of a lock washer constructed in accordance with my invention.
Figure 2:
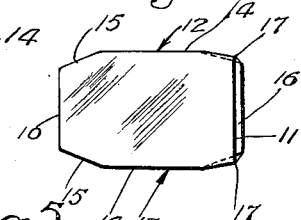
Fig. 2 is an end elevation of one segment of the washer.
Figure 3:
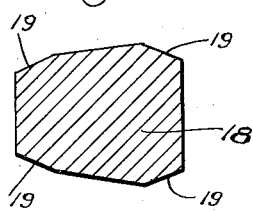
Fig. 3 is a sectional view through stock for formation of the washer shown in Figs. 1 and 2.
Figure 5:
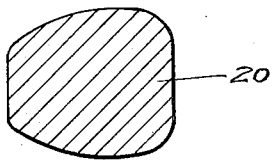
Fig. 5 is a section through a modified stock form.
Figure 4:
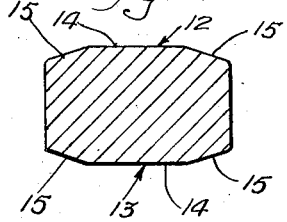
Fig. 4 is a cross section of the material after coiling.
Figure 6:
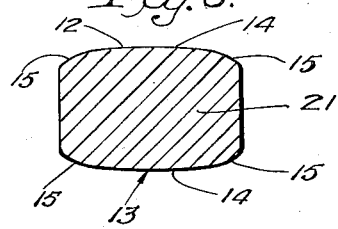
Fig. 6 shows the stock form of Fig. 5 after coiling.
Figure 7:
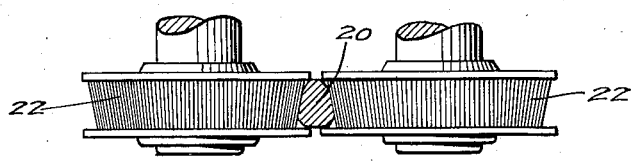
Fig. 7 shows the method of driving the stock to the coiling device.

Referring now more particularly to the drawing, the numerals 10 and 11 indicate the inner and outer peripheral faces of the washer and 12 and 13 the upper and lower axial faces thereof.

These upper and lower axial faces throughout substantially their entire lengths have a central flattened zone 14 bounded by beveled corners 15. At one end of the outer peripheral face 11 and at the opposite end of the inner peripheral face 10 these faces are reduced in width by swedging, as indicated at 16, thus producing a thickening of the metal lying between the beveled corners 15; the thickening however being such that the prongs 17 produced at the terminals of the faces of the inner and outer peripheral faces lie below the plane of the intermediate flattened zone 14 of the washer. This washer may be produced by employing a keystone shaped bar 18, the non-parallel faces of which are beveled as indicated at 19, the beveling at the thicker edge being slightly heavier than at the thinner edge. This cross section when coiled about a mandrel will produce the cross section of the washer just described. It is possible to employ in lieu of a true keystone cross section which has been modified by beveling the edges as just described, an ovate section such as shown at 20, this section being flattened at the end of its major axis and producing when coiled a section similar to that shown at 21. While section 21 would not have a truly flat zone centrally if merely coiled about a mandrel, the propelling devices employed for driving the wire to the mandrel usually comprise a pair of corrugated rollers 22 which very forcibly grip the axial faces of the wire and would have a tendency to flatten the central portion thereof at the same time corrugating them. This method of construction is not only advantageous in that it eliminates the objectionable prong formations resulting from the normal methods of lock washer construction but likewise has the advantage of producing a central corrugated rib upon the washer which acts to mill its way into the surface of the nut during the seating operation and thus further act to prevent spreading.

Since, as clearly indicated above, the modified keystone shape may be considerably varied, I do not wish to be understood as limiting myself to the particular forms herein illustrated, and it will be understood that in employing in the claims the term "modified keystone form" I refer to any cross section of this general type which will produce in a final coiled washer the beveled corners of the axial faces hereinbefore described.

I claim:

1. A lock washer comprising a die-severed helical segment of approximately 360° substantially rectangular in cross section, the side edges of the axial faces being beveled, opposite ends of the inner and outer peripheral faces being swedged inwardly with a resultant thickening of the metal between the beveled portions, the extreme thickness at such swedged portions being such that the axial surfaces of the swedged portions lie between the general planes of the central zones of the axial faces whereby the presence of upstanding corners or prongs which engage a nut adjacent the periphery of the face thereof are eliminated and spreading of the washer upon high speed application of the nut avoided.

2. A lock washer comprising a die-severed helical segment of approximately 360° substantially rectangular in cross section, the side edges of the axial faces being beveled, opposite ends of the inner and outer peripheral faces being swedged inwardly with a resultant thickening of the metal between the beveled portions, the extreme thickness at such swedged portions being such that the axial surfaces of the swedged portions lie between the general planes of the central zones of the axial faces whereby the presence of upstanding corners or prongs which engage a nut adjacent the periphery of the face thereof are eliminated and spreading of the washer upon high speed application of the nut avoided, said central zones being transversely milled.

CHANDLER C. WASHER.